United States Patent
Yan et al.

(10) Patent No.: US 10,009,096 B2
(45) Date of Patent: Jun. 26, 2018

(54) METHOD FOR ESTIMATING FREQUENCY OFFSET, APPARATUS AND SYSTEM

(71) Applicant: FUJITSU LIMITED, Kawasaki-shi, Kanagawa (JP)

(72) Inventors: Meng Yan, Beijing (CN); Yinwen Cao, Beijing (CN); Zhenning Tao, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 20 days.

(21) Appl. No.: 14/879,381

(22) Filed: Oct. 9, 2015

(65) Prior Publication Data
US 2016/0036524 A1 Feb. 4, 2016

Related U.S. Application Data

(63) Continuation of application No. PCT/CN2014/074994, filed on Apr. 9, 2014.

(30) Foreign Application Priority Data

Apr. 10, 2013 (CN) .......................... 2013 1 0122348

(51) Int. Cl.
*H04B 17/00* (2015.01)
*H04B 10/00* (2013.01)
(Continued)

(52) U.S. Cl.
CPC ......... *H04B 10/0795* (2013.01); *H04B 10/61* (2013.01); *H04B 10/6164* (2013.01);
(Continued)

(58) Field of Classification Search
CPC ............ H04B 10/0795; H04L 27/0014; H04L 2027/0016; H04L 2027/0046;
(Continued)

(56) References Cited

U.S. PATENT DOCUMENTS

| 5,422,917 A | * | 6/1995 | Scott | ......................... H03J 7/02 327/3 |
| 5,640,431 A | * | 6/1997 | Bruckert | ................ H04B 1/707 375/150 |

(Continued)

FOREIGN PATENT DOCUMENTS

| CN | 1988525 | 6/2007 |
| CN | 101447970 A | 6/2009 |

(Continued)

OTHER PUBLICATIONS

Guicai Yu et al., English Machine Translation of CN102546509A, Carrier Frequency Offset estimation method based on chirp training sequence. pp. 1-7.*

(Continued)

*Primary Examiner* — Ken N Vanderpuye
*Assistant Examiner* — Abbas H Alagheband
(74) *Attorney, Agent, or Firm* — Staas & Halsey LLP

(57) ABSTRACT

A method, apparatus and system for estimating frequency offset that includes: a first calculating unit to calculate a correlation value of each of multiple sequences with different lengths according to a received signal containing the sequences with different lengths, where each of the sequences is repeatedly transmitted many times in the signal; a second calculating unit to calculate a decimal frequency according to the correlation value; a first determining unit to determine an integer frequency offset according to the decimal frequency offset to which each of the sequences corresponds; and a second determining unit to determine a total frequency offset according to the decimal frequency offset and the integer frequency offset.

14 Claims, 3 Drawing Sheets

(51) Int. Cl.
*H04B 10/04* (2006.01)
*H04B 10/079* (2013.01)
*H04B 10/61* (2013.01)
*H04L 27/00* (2006.01)
*H04L 27/26* (2006.01)

(52) U.S. Cl.
CPC .......... *H04L 27/0014* (2013.01); *H04L 27/26* (2013.01); *H04L 2027/0016* (2013.01); *H04L 2027/0046* (2013.01); *H04L 2027/0065* (2013.01); *H04L 2027/0073* (2013.01)

(58) Field of Classification Search
CPC ..... H04L 2027/0065; H04L 2027/0073; H04L 25/02; H04L 27/26; H04L 27/38
USPC .................................. 398/25, 136, 158, 192
See application file for complete search history.

(56) References Cited

U.S. PATENT DOCUMENTS

| | | | |
|---|---|---|---|
| 7,596,181 B2 | 9/2009 | Chang et al. | |
| 7,599,420 B2* | 10/2009 | Forenza | H04B 7/0452 370/278 |
| 8,300,621 B2* | 10/2012 | Lim | H04L 27/0014 365/189.12 |
| 8,797,994 B2* | 8/2014 | Oketani | H04L 27/0014 370/330 |
| 8,855,485 B2* | 10/2014 | Nakagawa | H04L 27/2657 370/280 |
| 2004/0081205 A1* | 4/2004 | Coulson | H04L 27/2656 370/503 |
| 2005/0163262 A1* | 7/2005 | Gupta | H04L 27/2656 375/343 |
| 2006/0062317 A1* | 3/2006 | Chang | H04L 27/2607 375/260 |
| 2007/0297540 A1* | 12/2007 | Na | H04B 1/70735 375/342 |
| 2008/0080631 A1* | 4/2008 | Forenza | H04B 7/0684 375/260 |
| 2008/0130790 A1* | 6/2008 | Forenza | H04B 7/0452 375/299 |
| 2008/0313692 A1* | 12/2008 | Yun | H04N 21/235 725/131 |
| 2009/0067517 A1 | 3/2009 | Hung et al. | |
| 2009/0080906 A1 | 3/2009 | Tao et al. | |
| 2010/0232788 A1 | 9/2010 | Cai | |
| 2012/0148264 A1* | 6/2012 | Liu | H04B 10/61 398/202 |
| 2012/0287874 A1* | 11/2012 | Oketani | H04L 27/0014 370/329 |
| 2014/0169501 A1* | 6/2014 | Nazarathy | H03H 17/0266 375/316 |

FOREIGN PATENT DOCUMENTS

| | | | |
|---|---|---|---|
| CN | 102349248 A | 2/2012 | |
| CN | 102546509 | 7/2012 | |
| CN | 102546509 A * | 7/2012 | ............ H04L 25/02 |
| CN | 102647381 A | 8/2012 | |
| JP | 2008-505583 | 2/2008 | |

OTHER PUBLICATIONS

Written Opinion of the International Searching Authority dated Oct. 13, 2015 in corresponding International Patent Application No. PCT/CN2014/074994.
Chinese Office Action dated Oct. 9, 2016 in corresponding Chinese Patent Application No. 201310122348.3.
Chinese Search Report dated Sep. 26, 2016 in corresponding Chinese Patent Application No. 201310122348.3.
PCT International Search Report dated Jun. 30, 2014 in corresponding International Patent Application No. PCT/CN2014/074994.
Schmidl et al., "Robust Frequency and Timing Synchronization for OFDM", IEEE Transactions on Communications, vol. 45, No. 12, Dec. 1997, p. 1613-1621.
Beek et al., "ML Estimation of Time and Frequency Offset in OFDM Systems", IEEE Transactions on Signal Processing, vol. 45, No. 7, Jul. 1997, p. 1800-1805.
Speth et al., "Optimum Receiver Design for OFDM-Based Broadband Transmission—Part II: A Case Study", IEEE Transactions on Communications, vol. 49, No. 4, Apr. 2001, p. 571-578.
Li et al., "Wide-range, Accurate and Simple Digital Frequency Offset Compensator for Optical Coherent Receivers", OFC/NFOEC 2008, 3 pp.
Japanese Office Action dated Apr. 18, 2017 in Japanese Patent Application No. 2016-506770.

\* cited by examiner

METHOD FOR ESTIMATING FREQUENCY OFFSET, APPARATUS AND SYSTEM

CROSS-REFERENCE TO RELATED APPLICATIONS

This application is a continuation application, under 35 U.S.C. § 111(a), of international application No. PCT/CN2014/074994, filed Apr. 9, 2014, which is based on and claims Convention priority to Chinese patent application No. 201310122348.3, filed Apr. 10, 2013, the entire disclosure of which is herein incorporated by reference as a part of this application.

BACKGROUND

1. Field

The present disclosure relates to the field of communications, and in particular to a method for estimating frequency offset, an apparatus and a system.

2. Background

In a coherent optical communication system, there often exists frequency offset between a laser at a transmitter end and a laser at a receiver end, and this frequency offset must be estimated and compensated for when a transmitted signal is recovered at the receiver end. A commonly-used method for estimating frequency offset is to use correlation of a signal. A sequence is transmitted repeatedly at the transmitter end, and their correlation values are calculated at the receiver end. The correlation value can be calculated only when the sequence is transmitted repeatedly at least twice. And if it is repeatedly transmitted many times, multiple correlation values may be calculated and then averaged, so as to reduce influence of noises.

For the sake of simplicity, in the following description, two times of repeating is taken as an example. FIG. 1 is a schematic diagram of a signal containing two identical sequences. As shown in FIG. 1, wherein L is the length of the sequence, and s is a starting position.

A sampled signal at the receiver end may be denoted as $r(i)$, i in parenthesis is an integer, denoting a serial number of a sampling point. And calculation of correlation may be expressed as:

$$c = \sum_{i=0}^{L-1} r(s+i) r^*(s+i+L);$$

where, * denotes a conjugate, s is a starting position of the two identical time domain signal waveforms, L denotes a length of a sequence that is repeatedly transmitted. The following formula may be calculated according to an argument of the correlation value c:

$$\delta f = \frac{\arg(c)}{2\pi} \frac{f_s}{L}.$$

This estimation is referred to as decimal frequency offset estimation. As a range of the arg(•) calculation is $[-\pi, \pi]$, a range of $\delta f$ is $[-f_s/2L, f_s/2L]$. However, actual frequency offset may exceed such a range, and the exceeded part is referred to as integer frequency offset, which must be an integer multiple of $f_s/L$, and total frequency offset may be expressed as:

$$\Delta f = n \frac{f_s}{L} + \delta f.$$

In the above formula, the frequency offset is written as a sum of two parts, the first part $$n \frac{f_s}{L}$$

is referred to as integer frequency offset, and the second part $\delta f$ is referred to as decimal frequency offset. As the range size of $\delta f$ is $f_s/L$, seamless frequency offset estimation may be achieved only if the integer n is determined.

In an orthogonal frequency division multiplexing (OFDM) system, an existing method for estimating frequency offset is divided into two steps. In the first step, decimal frequency offset is estimated in a time domain, in which correlation of two repeated signals (specially designed OFDM symbol, or cyclic prefix contained in an OFDM signal) is often used (refer to references [1] and [2]). After the decimal frequency offset is compensated for, FFT (fast Fourier transformation) is performed on the signals, so as to obtain frequency domain signals. In the second step, integer frequency offset is estimated in a frequency domain. Some zero-padded virtual carriers are added into both sides of a spectrum of an OFDM signal, so as to achieve oversampling, as shown in FIG. 2. In an ideal case, see FIG. 2A in detail, power of subcarriers carrying data is non-zero, and power of the virtual carriers is zero. According to positions of the virtual carriers in the spectrum, or after finding subcarriers of relatively high power, the integer frequency offset may be deducted (refer to reference [3]). However, in an actual optical transmission system, as being subjected to noises and various transmission damages, a received signal may possible have certain power at a position of a virtual carrier, as shown in FIG. 2B. And a filter in a channel will change a spectral shape of the signal, and power of subcarriers carrying data close to the positions of the virtual carriers may possibly become relatively low, with low discrimination with the virtual carriers, resulting in greatly lowering the reliability of the method. The other method is to use pilot signals added to specific subcarriers. For example, in reference [4], pilot data in specific subcarriers of several consecutive OFDM symbols are set to be identical, and positions of the pilot subcarriers in a frequency domain may be determined according to this feature, thereby determining the integer frequency offset.

For a single-carrier system, the frequency offset estimation may be performed before equalization (refer to reference [5]). This method is fast in speed, needs no equalization, but is low in precision. The frequency offset estimation may also be performed after equalization (refer to reference [6]), but this method needs relatively long time of iterative convergence to obtain a result of frequency offset estimation, and the signals need to be subjected to equalization first.

REFERENCES

[1] Robust frequency and timing synchronization for OFDM, T. M. Schmidl and D. C. Cox, IEEE Transactions on Communications, vol. 45, no. 12, 1997;

[2] ML estimation of time and frequency offset in OFDM systems, van de Beek et. al., IEEE Transactions on Signal Processing, vol. 45, no. 7, 1997;

[3] Preamble sequence detection and integral carrier frequency offset estimation method for OFDM/OFDMA wireless communication system, Pub. No.: US 2009/0067517 A1;

[4] Optimal receiver design for OFDM-based broadband transmission, M. Speth, S. Fechtel, G. Fock et. al., IEEE Transactions on Communications, vol. 49, no. 4, 2001.
[5] Frequency offset monitoring device and optical coherent receiver, Pub. No.: US 2009/0080906 A1;
[6] Wide-range, accurate and simple digital frequency offset compensator for optical coherent receiver, L. Li, Z. Tao, S. Oda et. al., proceedings of OFC/NFOEC 2008.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the invention.

A major object of embodiments of the present disclosure is to provide a method for estimating frequency offset, an apparatus and a system, so as to solve the problems pointed out in the Background.

According to a first aspect of the embodiments of the present disclosure, there is provided an apparatus for estimating frequency offset, including:

a first calculating unit configured to calculate a correlation value of each of multiple sequences with different lengths according to a received signal containing the multiple sequences with different lengths, wherein each of the sequences being repeatedly transmitted many times in the signal;

a second calculating unit configured to calculate a decimal frequency offset to which each of the sequences corresponds according to the correlation value of each of the sequences;

a first determining unit configured to determine an integer frequency offset to which each of the sequences corresponds according to the decimal frequency offset to which each of the sequences corresponds; and a second determining unit configured to determine a total frequency offset according to the decimal frequency offset to which each of the sequences corresponds and the integer frequency offset to which each of the sequences corresponds.

According to a second aspect of the embodiments of the present disclosure, there is provided an apparatus for estimating frequency offset as described in the first aspect, wherein the signal is applied at two polarization states, and the correlation value to which each of the sequences corresponds is an average value or a summation of the correlation values at the two polarization states.

According to a third aspect of the embodiments of the present disclosure, there is provided a single-polarization receiver; wherein the receiver includes the apparatus for estimating frequency offset as described in the first aspect.

According to a fourth aspect of the embodiments of the present disclosure, there is provided a single-polarization coherent optical communication system, including:

a transmitter configured to transmit a signal, the signal containing multiple sequences with different lengths, the sequences being repeatedly transmitted many times in the signal; and the single-polarization receiver as described in the third aspect.

According to a fifth aspect of the embodiments of the present disclosure, there is provided a dual-polarization receiver, the receiver including the apparatus for estimating frequency offset as described in the second aspect.

According to a sixth aspect of the embodiments of the present disclosure, there is provided a dual-polarization coherent optical communication system, including:

a transmitter configured to transmit signals, the signals containing h polarization state signal and v polarization state signal, the h polarization state signal and v polarization state signal respectively containing multiple sequences with different lengths, the sequences being repeatedly transmitted many times in the polarization state signals; and the dual-polarization receiver as described in the fifth aspect.

An advantage of the embodiments of the present disclosure exists in that with the method for estimating frequency offset, apparatus and system of the embodiments of the present disclosure, in comparison with existing methods applicable to OFDM systems, the method provided by embodiments of the present disclosure completely operates in a time domain, needs only to calculate correlation values of some sequences with different lengths without FFT operation, and is simple in implementation; and in comparison with existing methods applicable to single-carrier systems, the method provided by embodiments of the present disclosure uses repeated sequences with different lengths provided in transmission data, needs not to perform equalization on the signals first, has no process of iterative convergence, is able to obtain a result of frequency offset estimation quickly, and is high in precision.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

These and/or other aspects and advantages will become apparent and more readily appreciated from the following description of the embodiments, taken in conjunction with the accompanying drawings of which:

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced. Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

In the drawings:

FIG. 1 is a schematic diagram of a time domain signal containing two identical sequences;

FIG. 2A is a schematic diagram of a spectrum of an OFDM signal in an ideal case;

FIG. 2B is a schematic diagram of a spectrum of an OFDM signal in a case of being subjected to noises and transmission damages;

FIG. 3 is a schematic diagram of a structure of the apparatus for estimating frequency offset of an embodiment of the present disclosure;

FIG. 4 is a schematic diagram of a signal containing two sequences with different lengths;

FIG. 5 is a schematic diagram of a signal provided with repeated sequences with different lengths at two polarization states;

FIG. 6 is a schematic diagram of a structure of the single-polarization coherent optical communication system of an embodiment of the present disclosure;

FIG. 7 is a schematic diagram of a structure of the dual-polarization coherent optical communication system of an embodiment of the present disclosure; and FIG. 8 is a flowchart of the method for estimating frequency offset of an embodiment of the present disclosure.

DETAILED DESCRIPTION

Figure 1:
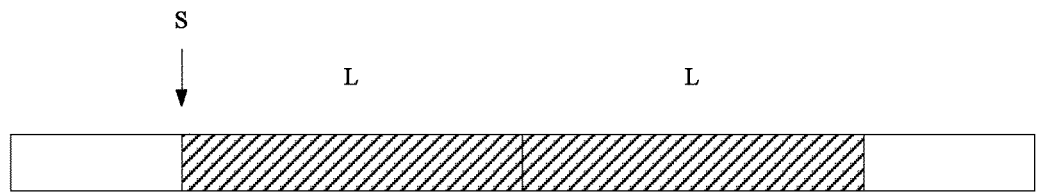
Figure 2A:
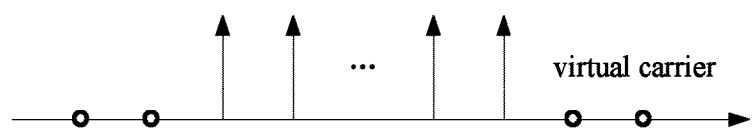
Figure 2B:
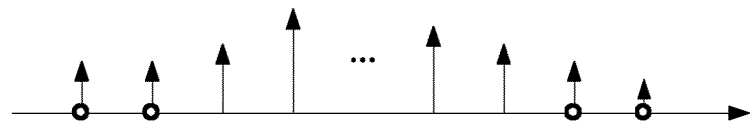

Reference will now be made in detail to the embodiments, examples of which are illustrated in the accompanying drawings, wherein like reference numerals refer to the like elements throughout. The embodiments are described below to explain the present invention by referring to the figures.

The foregoing and other features of the embodiments of the present disclosure shall become apparent with reference to the drawings and the following description. These embodiments are illustrative only, and are not intended to limit the present disclosure. For the principles and implementations of the present disclosure to be easily understood by those skilled in the art, the embodiments of the present disclosure shall be described taking that two sequences with different lengths are respectively transmitted twice repeatedly as examples. However, it should be understood that the embodiments of the present disclosure are not limited thereto, and in particular implementations, three or more sequences with different lengths may also be transmitted, each sequence may be repeatedly transmitted three times or more, and the numbers of times of transmission of the sequences may be identical or different.

Exemplary embodiments of the present disclosure shall be described below with reference to the drawings.

Embodiment 1

Figure 3:
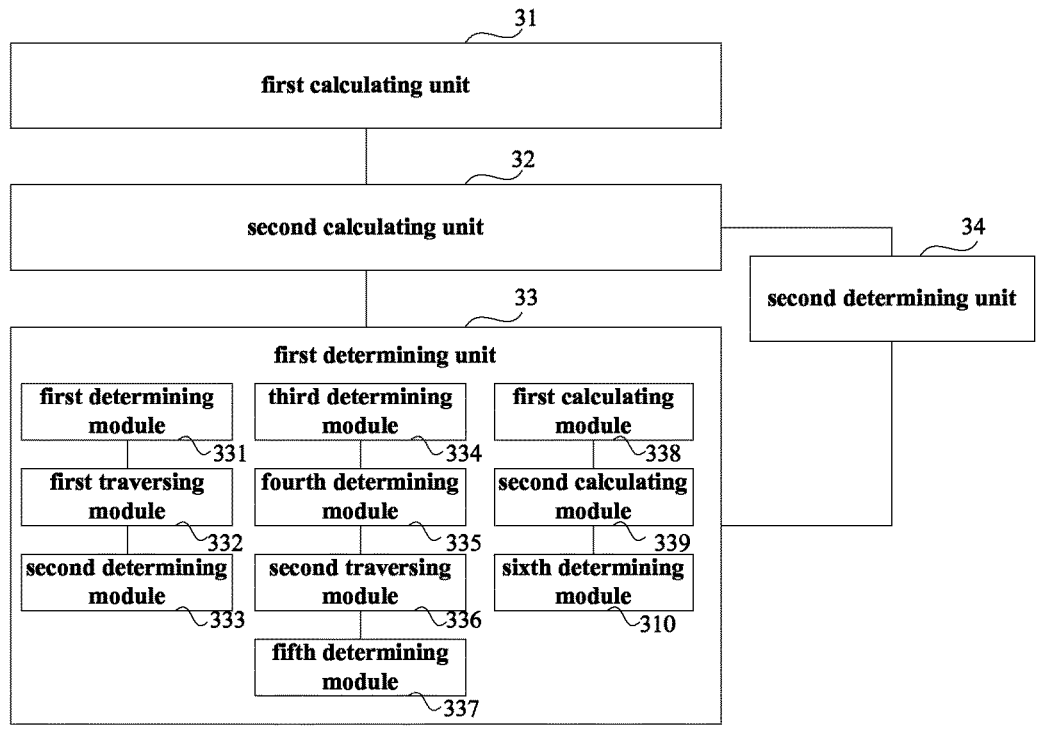

An embodiment of the present disclosure provides an apparatus for estimating frequency offset, applicable to a receiver end of a coherent optical communication system. FIG. 3 is a schematic diagram of a structure of the apparatus. As shown in FIG. 3, the apparatus includes: a first calculating unit 31, a second calculating unit 32, a first determining unit 33 and a second determining unit 34; wherein, the first calculating unit 31 is configured to calculate a correlation value of each of multiple sequences with different lengths according to a received signal containing the multiple sequences with different lengths, wherein each of the sequences is repeatedly transmitted many times in the signal;

the second calculating unit 32 is configured to calculate a decimal frequency offset to which each of the sequences corresponds according to the correlation value of each of the sequences;

the first determining unit 33 is configured to determine an integer frequency offset to which each of the sequences corresponds according to the decimal frequency offset to which each of the sequences corresponds;

and the second determining unit 34 is configured to determine a total frequency offset according to the decimal frequency offset to which each of the sequences corresponds and the integer frequency offset to which each of the sequences corresponds.

In this embodiment, a transmitter end transmits a signal, the signal containing multiple sequences with different lengths, and each of the sequences being repeatedly transmitted in the signal for many times, hence the first calculating unit 31 may calculate the correlation value to which each of multiple sequences corresponds according to received signal.

In an implementation, the first calculating unit 31 may calculate the correlation value of each of the sequences according to the method described in the Background. For example, it may calculate the correlation value of each of the sequences according to the formula below:

$$c_{seq} = \Sigma_{i=0}^{L_{seq}-1} r(s_{seq}+i) r^*(s_{seq}+i+L_{seq});$$

where, $c_{seq}$ is the correlation value to which the sequence corresponds, $L_{seq}$ is the length of the sequence, $s_{seq}$ is the starting position of the sequence, and i is the serial number of sampling points.

Hence, the correlation value to which each of the sequences corresponds may be obtained through calculation by the first calculating unit 31.

In this example, the above method of calculation is an example only, and this embodiment is not limited thereto, and any methods for calculating a correlation value of a sequence contained in a signal according to received signal are covered by the protection scope of the present disclosure.

In this example, when the signal contains two polarization states, that is, when the signal is a dual-polarization signal, the correlation value to which each of the sequences corresponds is an average value or a summation of the correlation values at the two polarization states. That is, the signal at each polarization state contains multiple sequences with different lengths, and each of the sequences is repeatedly transmitted many times in the signal at each polarization state. For each sequence, and at each polarization state, a correlation value may be obtained through the above calculation. And the correlation value of the sequence is obtained by averaging or summating the correlation values at the two polarization states to which the sequence corresponds.

In this embodiment, the second calculating unit 32 may calculate the decimal frequency offset to which each of the sequences corresponds according to the correlation value to which each of the sequences corresponds by using a result of calculation of the first calculating unit 31.

In an implementation, the second calculating unit 32 may calculate the decimal frequency offset to which each of the sequences corresponds by using the formula below:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

Hence, the decimal frequency offset to which each of the sequences corresponds may be obtained through calculation by the second calculating unit 32.

In this example, the above method of calculation is an example only, this embodiment is not limited thereto, and any methods for calculating a decimal frequency offset according to a correlation value of a sequence are covered by the protection scope of the present disclosure.

In this embodiment, multiple correlation values and multiple decimal frequency offsets to which the multiple sequences correspond are obtained through calculation by the first calculating unit 31 and the second calculating unit 32, and an integer frequency offset to which each of the sequences corresponds may be determined by the first determining unit 33 by using the multiple decimal frequency offsets.

In an implementation, the first determining unit 33 may determine an optimal value of an integral value of an integer frequency offset to which each of the sequences corresponds by traversing each integral value in a range of the integral value of the integer frequency offset to which each of the sequences corresponds, so as to determine the integer frequency offset. In this implementation, the first determining unit 33 may include a first determining module 331, a first traversing module 332 and a second determining module 333; wherein, the first determining module 331 may determine a range of an integral value of the integer frequency offset to which each of the sequences corresponds according to the formula below:

$$|n_{seq}| \leq N_{seq};$$

where, $$N_{seq} = \text{ceil}\left(\frac{\Delta f_{max}}{f_s / L_{seq}}\right) + 1,$$

$\Delta f_{max}$ is a possible maximal value of a frequency offset between an emitting laser and a local oscillator laser, $L_{seq}$ is the length of the sequence, and $f_s$ is a sampling rate;

the first traversing module 332 may traverse each integral value in the range of the integral value of the integer frequency offset to which each of the sequences corresponds, so as to obtain an integral value to which each of the sequences corresponds, which minimizes the absolute value of the difference between the total frequency offsets to which all the sequences correspond;

and the second determining module 333 may determine the integer frequency offset to which each of the sequences corresponds by using the integral value of the integer frequency offset to which each of the sequences corresponds obtained by the first traversing module 332.

In another implementation, the first determining unit 33 may determine a function relationship of an integral value of an integer frequency offset to which one of the sequences corresponds relative to integral values of integer frequency offsets to which other sequences correspond according to a constraint relationship between integral values of the integer frequency offsets to which each of the sequences corresponds, and then determine the optimal value of the integral value of the integer frequency offset to which each of the sequences corresponds by traversing each integral value in the range of the integral value of the integer frequency offset to which the sequence corresponds, so as to determine the integer frequency offset. In this implementation, taking that the signal contains two sequences with different lengths as an example, the first determining unit 33 may include a third determining module 334, a fourth determining module 335, a second traversing module 336 and a fifth determining module 337; wherein, the third determining module 334 may determine a range of an integral value of the integer frequency offset to which one of the two sequences corresponds according to the formula below:

$$|n_1| \leq N_1;$$

where, $$N_1 = \text{ceil}\left(\frac{\Delta f_{max}}{f_s / L_1}\right) + 1,$$

$\Delta f_{max}$ is the possible maximal value of the frequency offset between the emitting laser and the local oscillator laser, $L_1$ is the length of the one sequence, and $n_1$ is the integral value of the integer frequency offset to which the one sequence corresponds;

the fourth determining module 335 may determine an integral value of the integer frequency offset to which the other sequence corresponds according to the formula below:

$$n_2 = \text{round}\left(\frac{n_1 f_s / L_1 + \delta f_1 - \delta f_2}{f_s / L_2}\right);$$

where, $n_1$ is the integral value of the integer frequency offset to which the one sequence corresponds, $n_2$ is the integral value of the integer frequency offset to which the other sequence corresponds, $L_1$ is the length of the one sequence, $L_2$ is the length of the other sequence, $\delta f_1$ is the decimal frequency offset to which the sequence with the length $L_1$ corresponds, and $\delta f_2$ is the decimal frequency offset to which the sequence with the length $L_2$ corresponds, both $\delta f_1$ and $\delta f_2$ being obtained through calculation by the second calculating unit 32;

the second traversing module 336 may traverse each integral value in the range of the integral value of the integer frequency offset to which the one sequence corresponds, so as to obtain an integral value, which minimizes the absolute value of the difference between the total frequency offsets to which all the sequences correspond;

and the fifth determining module 337 may determine an integral value of the integer frequency offset to which the other sequence corresponds according to the integral value obtained by the second traversing module 336, so as to obtain the integer frequency offset to which each of the sequences corresponds by using the integral value of the integer frequency offset to which each of the sequences corresponds.

In another implementation, the first determining unit 33 may first use a correlation value to which each of the sequences corresponds to calculate a coarse estimation value of the total frequency offset, and then use the coarse estimation value of the total frequency offset to determine the integral value to which each of the sequences corresponds, so as to determine the integer frequency offset to which each of the sequences corresponds. In this implementation, still taking that the signal contains two sequences with different lengths as an example, the first determining unit 33 may include a first calculating module 338, a second calculating module 339 and a sixth determining module 310; wherein, the first calculating module 338 may calculate an coarse estimation value of the total frequency offset according to the formula below:

$$\delta f_c = \frac{\arg(c_1 c_2^*)}{2\pi} \frac{f_s}{L_1 - L_2};$$

where, $c_1$ and $c_2$ are the correlation values to which the two sequences correspond, respectively, $f_s$ is the sampling rate, and $L_1$ and $L_2$ are the lengths of the two sequences, respectively;

the second calculating module 339 may calculate an integral value of the integer frequency offset to which each of the sequences corresponds according to the formula below:

$$n_1 = \text{round}\left(\frac{\delta f_c}{f_s/L_1}\right),$$

$$n_2 = \text{round}\left(\frac{\delta f_c}{f_s/L_2}\right);$$

where, $\Delta f_{max} \leq f_s/2|L_1 - L_2|$, $\Delta f_{max}$ is the possible maximal value of the frequency offset between the emitting laser and the local oscillator laser;

and the sixth determining module 310 may determine the integer frequency offset to which each of the sequences corresponds by using the integral value of the integer frequency offset to which each of the sequences corresponds.

In this embodiment, after obtaining the decimal frequency offsets to which the sequences correspond through calculation by the second calculating unit and determining the integer frequency offsets to which the sequences correspond by the first determining unit according to the result of calculation of the second calculating unit, the total frequency offset to which each of the sequences correspond may be determined by the second determining unit by using the decimal frequency offsets to which the sequences correspond obtained through calculation by the second calculating unit and the integer frequency offsets to which the sequences correspond determined by the first determining unit. And finally, an average value of the total frequency offsets to which the sequences correspond may be taken as a final result of frequency offset estimation.

For the operational principles of the apparatus for estimating frequency offset of this embodiment to be more clear and easy to be understood, the apparatus for estimating frequency offset of this embodiment shall be described below in detail with reference to the drawings taking that the received signal contains two sequences with different lengths and each sequence is respectively transmitted in the signal twice as an example.

Figure 4:
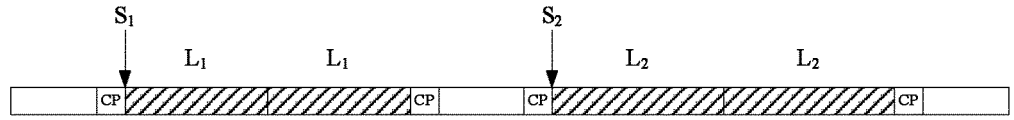

FIG. 4 is a schematic diagram of the signal containing two sequences with different lengths. As shown in FIG. 4, the lengths of the two sequences are $L_1$ and $L_2$, respectively. For calculating correlation, both of the two sequences are repeatedly transmitted twice. $s_1$ and $s_2$ denote starting positions of the two sequences. In order to resist inter-symbol interference (ISI) introduced into a channel, a cyclic prefix and a cyclic postfix may be added before and after the sequences, and only if lengths of them are greater than maximum time delay expansion of the channel, identical waveforms of the two sequences in the front and back in case of having ISI may be ensured. The two sequences may be distributed in any positions of the transmitted signal, and are not temporally required to be consecutive. The blank part in FIG. 4 denotes other transmission data.

In this example, the example shown in FIG. 4 takes that the sequences are repeatedly transmitted twice as an example. However, this embodiment is not limited thereto, and the number of repeats may be more than two. And at this moment, multiple correlation values may be calculated for each sequence. For example, the number of repeats is m, m−1 correlation values may be calculated, and a final correlation value to which the sequence corresponds may be obtained by averaging them.

In this embodiment, the first calculating unit 31 of the apparatus for estimating frequency offset may calculate respective correlation values of the above two sequences according to the formula below:

$$c_1 = \sum_{i=0}^{L_1-1} r(s_1+i) r^*(s_1+i+L_1) \quad (1.1)$$

$$c_2 = \sum_{i=0}^{L_2-1} r(s_2+i) r^*(s_2+i+L_2) \quad (1.2).$$

Based on the correlation values $c_1$ and $c_2$, the second calculating unit 32 of the apparatus for estimating frequency offset may calculate two decimal frequency offsets of the above two sequences according to the formula below:

$$\delta f_1 = \frac{\arg(c_1)}{2\pi} \frac{f_s}{L_1} \quad (2.1)$$

$$\delta f_2 = \frac{\arg(c_2)}{2\pi} \frac{f_s}{L_2}; \quad (2.2)$$

where, as described above, $f_s$ is the sampling rate, and $L_1$ and $L_2$ are the lengths of the two sequences ($L_1 \neq L_2$). It is clear and understood that ranges of the two decimal frequency offsets may respectively be:

$$\delta f_1 \in [-f_s/2L_1, f_s/2L_1]$$

$$\delta f_2 \in [-f_s/2L_2, f_s/2L_2].$$

As described in the Background, as the total frequency offset is a sum of the integer frequency offset and the decimal frequency offset, the total frequency offsets to which the two sequences respectively correspond may be respectively expressed as:

$$\Delta f_1 = n_1 \frac{f_s}{L_1} + \delta f_1 \quad (3.1)$$

$$\Delta f_2 = n_2 \frac{f_s}{L_2} + \delta f_2; \quad (3.2)$$

where, $\Delta f_1$ and $\Delta f_2$ are estimation of actual frequency offsets by the two sequences respectively, and $$n_1 \frac{f_s}{L_1} \text{ and } n_2 \frac{f_s}{L_2}$$

are integer frequency offsets, $n_1$ and $n_2$ are integers to be determined. As both $\Delta f_1$ and $\Delta f_2$ are two independent estimation performed on the same physical quantity (a real frequency offset $\Delta f$), their values should be equal in an ideal case. When estimation errors of $\delta f_1$ and $\delta f_2$ are relatively small, a difference between $\Delta f_1$ and $\Delta f_2$ should also be relatively small.

And on the other hand, the real frequency offset $\Delta f$ generally has a range, and an absolute value of which is limited by the formula below:

$$|\Delta f| \leq \Delta f_{max};$$

where, $\Delta f_{max}$ is a possible maximal value of a frequency offset between an emitting laser and a local oscillator laser, that is, a maximal frequency offset possibly existing between the emitting laser and the local oscillator laser.

For example, in a coherent optical communication system, as a frequency drift of the emitting laser and the local oscillator laser may be controlled within ±2.5 GHz, a frequency offset between the two lasers may be within ±5 GHz, i.e. $\Delta f_{max}$=5 GHz. Taking such a factor into account, values of the integers $n_1$ and $n_2$ are also in certain ranges:

$$|n_1| \leq N_1 \quad N_1 = \text{ceil}\left(\frac{\Delta f_{max}}{f_s/L_1}\right) + 1 \tag{4.1}$$

$$|n_2| \leq N_2 \quad N_2 = \text{ceil}\left(\frac{\Delta f_{max}}{f_s/L_2}\right) + 1; \tag{4.2}$$

where, ceil(•) denotes a roundup operation.

By making the results $\Delta f_1$ and $\Delta f_2$ of the two times of independent frequency offset estimation to be closest, the final result of frequency offset estimation may be obtained, which is mathematically expressed as:

$$\min_{n_1, n_2} \{|\Delta f_1 - \Delta f_2|\} \tag{5}$$

$$\text{s.t. } |n_1| \leq N_1, |n_2| \leq N_2.$$

It can be seen that this is an integer programming problem with a constraint, which may be solved by using a suitable optimization method. After $n_1$ and $n_2$ are determined, the result of frequency offset estimation may be obtained according to Formula (3.1) or (3.2).

Hence, in an implementation of this embodiment, the values of $N_1$ and $N_2$ are related to the maximal frequency offset, the sampling rate and the lengths of the sequences. By reasonably selecting the lengths $L_1$ and $L_2$ of the sequences, the values of $N_1$ and $N_2$ may be made relatively small. And at this moment, all possible values of $n_1$ and $n_2$ may be traversed directly to find out a solution of Formula (5).

In another implementation of this embodiment, a constraint relationship between $n_1$ and $n_2$ may be employed. If $n_1$ is given, according to formulae (3.1) and (3.2), $n_2$ making Formula (5) to take a minimum value should satisfy:

$$n_2 = \text{round}\left(\frac{n_1 f_s/L_1 + \delta f_1 - \delta f_2}{f_s/L_2}\right); \tag{6}$$

where, round(•) denotes rounding. Given the constraint relationship in Formula (6), Formula (5) may be rewritten as:

$$\min_{n_1, n_2} \{|\Delta f_1 - \Delta f_2|\} \tag{7}$$

$$\text{s.t. } n_2 = \text{round}\left(\frac{n_1 f_s/L_1 + \delta f_1 - \delta f_2}{f_s/L_2}\right)$$

$$\text{s.t. } |n_1| \leq N_1;$$

where, $\Delta f_1$ and $\Delta f_t$ are still expressed by Formula (3). Formula (7) is an integer programming problem containing only an unknown integer $n_1$, and a solution of Formula (7) may be found by traversing all possible values of $n_1$.

In a further implementation of this embodiment, coarse estimation may be performed on the total frequency offset according to the correlation values obtained by using formulae (1.1) and (1.2), so as to obtain a coarse estimation value of the total frequency offset as follows:

$$\delta f_c = \frac{\arg(c_1 c_2^*)}{2\pi} \frac{f_s}{L_1 - L_2}. \tag{8}$$

It is clear and understood that the range of $\delta f_c$ is $$\left[-\frac{f_s}{2|L_1 - L_2|}, \frac{f_s}{2|L_1 - L_2|}\right].$$

When the lengths of the two sequences are relatively close, $|L_1 - L_2|$ is a relatively small integer, and the range of $\delta f_c$ is relatively large. And when the range of $\delta f_c$ contains a maximum value $\pm \Delta f_{max}$ that can be reached by the frequency offset, Formula (8) may be used to determine the values of $n_1$ and $n_2$, that is, $$n_1 = \text{round}\left(\frac{\delta f_c}{f_s/L_1}\right) \tag{9.1}$$

$$n_2 = \text{round}\left(\frac{\delta f_c}{f_s/L_2}\right). \tag{9.2}$$

After $n_1$ and $n_2$ are determined, an estimation result of the total frequency offset may be obtained according to formulae (3.1) or (3.2), or by averaging the results of the formulae (3.1) and (3.2).

In this implementation, the lengths of the two sequences need to satisfy the following condition, that is, $$\Delta f_{max} \leq \frac{f_s}{2|L_1 - L_2|}.$$

The integer frequency offsets to which the sequences correspond may be determined by using the above three manners of this embodiment, thereby determining the total frequency offset.

In the above implementations, the description is given taking that the signal contains two sequences with different lengths and each sequence is repeatedly transmitted twice as an example. However, this embodiment is not limited thereto. And in other embodiments, more sequences with different lengths may also be contained in the signal, each sequence may be repeatedly transmitted more times, and the numbers of times of repeat of transmission of the sequences may be identical or different.

For example, the signal contains three sequences with different lengths, each sequence is repeatedly transmitted twice, and the lengths of the sequences are $L_1$, $L_2$ and $L_3$, respectively, $L_1 \neq L_2 \neq L_3$. At this moment, correlation values and decimal frequency offsets of the sequences may be respectively calculated according to the above method, and integer frequency offsets to which the sequences correspond may be estimated by using the decimal frequency offsets of the sequences under the guidance of the spirits of the above three implementations of the present disclosure, thereby obtaining an estimation result of a total frequency offset.

For another example, the signal contains three sequences with different lengths, each sequence is repeatedly transmitted three times, and the lengths of the sequences are $L_1$, $L_2$ and $L_3$, respectively, $L_1 \neq L_2 \neq L_3$. At this moment, for each of the sequences, multiple correlation values may be obtained through calculation, and an average value of the multiple correlation values may be taken as a correlation value to which the sequence corresponds. Then decimal frequency offsets of the sequences may respectively be calculated according to the above method, and integer frequency offsets to which the sequences correspond may be estimated by using the decimal frequency offsets of the sequences under the guidance of the spirits of the above three implementations of the present disclosure, thereby obtaining an estimation result of a total frequency offset.

For a further example, the signal contains three sequences with different lengths, and the lengths of the sequences are $L_1$, $L_2$ and $L_3$, respectively, $L_1 \neq L_2 \neq L_3$. The sequence with length $L_1$ is repeatedly transmitted three times in the signal, the sequence with length $L_2$ is repeatedly transmitted four times in the signal, and the sequence with length $L_3$ is repeatedly transmitted twice in the signal, and correlation values, decimal frequency offsets and integer frequency offsets to which the sequences correspond may be calculated according to the above method, thereby obtaining a total frequency offset.

In this embodiment, the signal may be a single-polarization signal, and may also be a dual-polarization signal. And when the signal is applied at two polarization states, the correlation value to which each of the sequences corresponds is an average value or a summation of the correlation values at the two polarization states.

Figure 5:
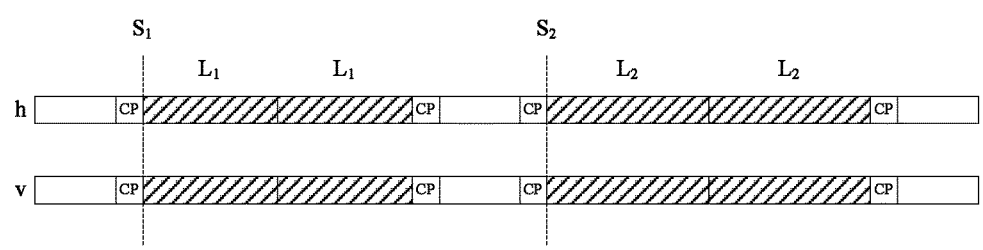

FIG. 5 is a schematic diagram of a signal provided with repeated sequences with different lengths at two polarization states. As shown in FIG. 5, a total frequency offset is determined by repeatedly transmitting sequences with different lengths at the two polarization states, performing correlation at a receiver end on the signals at the two polarization states, performing averaging (or summating), which is taken as a correlation value of each of the sequences, and then determining a decimal frequency offset and an integer frequency offset to which each of the sequences corresponds through calculation by using the above method.

For example, for one sequence, its correlation value may be calculated according to the formula below:

$$c_h = \sum_{i=0}^{L-1} r_h(s+i) r_h^*(s+i+L),$$

$$c_v = \sum_{i=0}^{L-1} r_v(s+i) r_v^*(s+i+L),$$

$$c = (c_h + c_v)/2.$$

With the apparatus for estimating frequency offset of the embodiment of the present disclosure, correlation values of multiple sequences with different lengths are calculated. Although each correlation value gives only a decimal frequency offset, after integrating decimal frequency offsets given by multiple correlation values, integer frequency offsets can be deducted therefrom, and the total frequency offset may be obtained finally. In comparison with existing methods for estimating frequency offset, the apparatus for estimating frequency offset provided by the embodiment of the present disclosure has advantages as follows: the apparatus for estimating frequency offset provided by the embodiment of the present disclosure differs from existing methods applicable to an OFDM system in that it completely operates in a time domain, needs only to calculate correlation values of some sequences with different lengths without FFT operation, and is simple in implementation; and the apparatus for estimating frequency offset provided by embodiments of the present disclosure differs from existing methods applicable to single-carrier systems in that it uses repeated sequences with different lengths provided in transmission data, needs not to perform equalization on the signals first, has no process of iterative convergence, is able to obtain a result of frequency offset estimation quickly, and is high in precision. It is shown by simulation that the apparatus for estimating frequency offset provided by embodiments of the present disclosure is well tolerable to various channel damages, and is able to give a reliable result of frequency offset estimation.

Embodiment 2

An embodiment of the present disclosure further provides a single-polarization receiver, including, in addition to original components and functions, the apparatus for estimating frequency offset described in Embodiment 1, so as to perform frequency offset estimation. As the apparatus for estimating frequency offset has been described in Embodiment 1, the contents of which are incorporated herein, which shall not be described herein any further.

With the single-polarization receiver of the embodiment of the present disclosure, the apparatus for estimating frequency offset in the receiver is used to perform frequency offset estimation, thereby improving reception performance.

Embodiment 3

Figure 6:
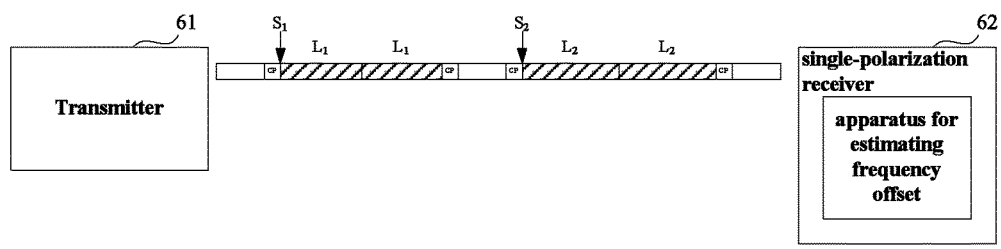

An embodiment of the present disclosure further provides a single-polarization coherent optical communication system. FIG. 6 is a schematic diagram of a structure of the system. Referring to FIG. 6, the system includes a transmitter 61 and a receiver 62; wherein, the transmitter 61 is configured to transmit a signal, the signal containing, in addition to original transmission data, multiple sequences with different lengths, the sequences being repeatedly transmitted many times in the signal;

and the receiver 62 is configured to perform frequency offset estimation, which may be carried out by the single-polarization receiver described in Embodiment 2, the contents of which being incorporated herein, which shall not be described herein any further.

With the single-polarization coherent optical communication system of the embodiment of the present disclosure, the apparatus for estimating frequency offset in the receiver is used to perform frequency offset estimation, thereby improving reliability of data transmission.

Embodiment 4

An embodiment of the present disclosure further provides a dual-polarization receiver, including, in addition to original components and functions, the apparatus for estimating frequency offset described in Embodiment 1 of the present disclosure, so as to perform frequency offset estimation. In this embodiment, correlation values of sequences are average values or summations of the correlation values of the sequences at the two polarization states. As the apparatus for estimating frequency offset has been described in Embodiment 1, the contents of which are incorporated herein, which shall not be described herein any further.

With the dual-polarization receiver of the embodiment of the present disclosure, the apparatus for estimating frequency offset in the receiver is used to perform frequency offset estimation, thereby improving reception performance.

Embodiment 5

Figure 7:
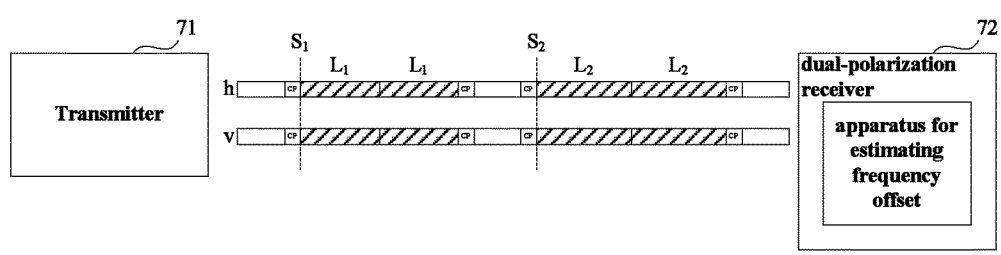

An embodiment of the present disclosure further provides a dual-polarization coherent optical communication system. FIG. 7 is a schematic diagram of a structure of the system. Referring to FIG. 7, the system includes a transmitter 71 and a receiver 72; wherein, the transmitter 71 is configured to transmit signals, the signals containing h polarization state signal and v polarization state signal, the h polarization state signal and v polarization state signal respectively containing, in addition to respective transmission data, multiple sequences with different lengths, the sequences being repeatedly transmitted many times in the polarization state signals;

and the receiver 72 is configured to perform frequency offset estimation, which may be carried out by the dual-polarization receiver described in Embodiment 4, the contents of which being incorporated herein, which shall not be described herein any further.

With the dual-polarization coherent optical communication system of the embodiment of the present disclosure, the apparatus for estimating frequency offset in the receiver is used to perform frequency offset estimation, thereby improving reliability of data transmission.

An embodiment of the present disclosure further provides a method for estimating frequency offset. As principles of the method for solving problems are similar to that of the apparatus for estimating frequency offset of Embodiment 1, the implementation of the apparatus of Embodiment 1 may be referred to for the implementation of the method, with identical contents being not going to be described herein any further.

Embodiment 6

Figure 8:
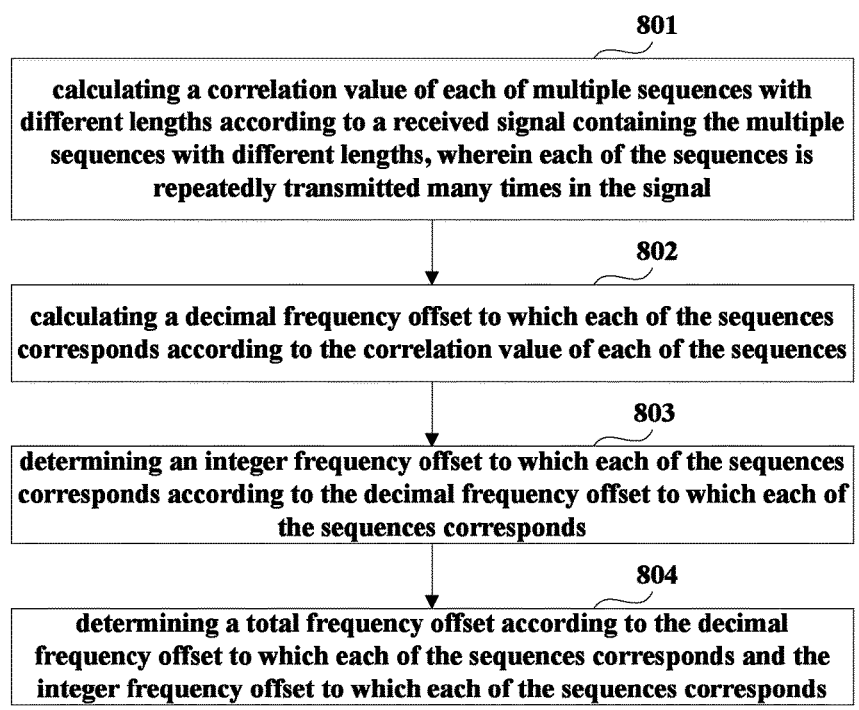

An embodiment of the present disclosure further provides a method for estimating frequency offset. FIG. 8 is a flowchart of the method. Referring to FIG. 8, the method includes:

step 801: calculating a correlation value of each of multiple sequences with different lengths according to a received signal containing the multiple sequences with different lengths, wherein each of the sequences is repeatedly transmitted many times in the signal;

step 802: calculating a decimal frequency offset to which each of the sequences corresponds according to the correlation value of each of the sequences;

step 803: determining an integer frequency offset to which each of the sequences corresponds according to the decimal frequency offset to which each of the sequences corresponds; and step 804: determining a total frequency offset according to the decimal frequency offset to which each of the sequences corresponds and the integer frequency offset to which each of the sequences corresponds.

In step 801, the correlation value to which each of the sequences corresponds may be calculated by using the formula below:

$$c_{seq} = \Sigma_{i=0}^{L_{seq}-1} r(s_{seq}+i) r^*(s_{seq}+i+L_{seq});$$

where, $c_{seq}$ is the correlation value to which the sequence corresponds, $L_{seq}$ is the length of the sequence, $s_{seq}$ is the starting position of the sequence, and i is the serial number of sampling points.

In step 802, the decimal frequency offset to which each of the sequences corresponds may be calculated by using the formula below:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

In an implementation of step 803, for each of the sequences, the integer frequency offset to which it corresponds may be estimated according to the method below, which including:

S1: determining a range of an integral value of the integer frequency offset to which each of the sequences corresponds according to the formula below:

$$|n_{seq}| \leq N_{seq};$$

where, $$N_{seq} = \text{ceil}\left(\frac{\Delta f_{max}}{f_s / L_{seq}}\right) + 1,$$

$\Delta f_{max}$ is a possible maximal value of a frequency offset between an emitting laser and a local oscillator laser;

S2: traversing each integral value in the range of the integral value of the integer frequency offset to which each of the sequences corresponds, so as to obtain an integral value of the integer frequency offset to which each of the sequences corresponds, which minimizes the absolute value of the difference between the total frequency offsets to which all the sequences correspond; and S3: determining the integer frequency offset to which each of the sequences corresponds by using the integral value of the integer frequency offset to which each of the sequences corresponds.

In an implementation of step 803, the number of the multiple sequences is two, and for each of the sequences, the integer frequency offset to which it corresponds may be estimated according to the method below, which including:

S1': determining a range of an integral value of the integer frequency offset to which one of the two sequences corresponds according to the formula below:

$$|n_1| \leq N_1;$$

where, $$N_1 = \text{ceil}\left(\frac{\Delta f_{max}}{f_s / L_1}\right) + 1,$$

$\Delta f_{max}$ is the possible maximal value of the frequency offset between the emitting laser and the local oscillator laser, $L_1$ is the length of the one sequence, and $n_1$ is the integral value of the integer frequency offset to which the one sequence corresponds;

S2': determining an integral value of the integer frequency offset to which the other sequence corresponds according to the formula below:

$$n_2 = \text{round}\left(\frac{n_1 f_s / L_1 + \delta f_1 - \delta f_2}{f_s / L_2}\right);$$

where, $n_1$ is the integral value of the integer frequency offset to which the one sequence corresponds, $n_2$ is the integral value of the integer frequency offset to which the other sequence corresponds, $L_1$ is the length of the one sequence, $L_2$ is the length of the other sequence, $\delta f_1$ is the decimal frequency offset to which the sequence with the length $L_1$ corresponds, and $\delta f_2$ is the decimal frequency offset to which the sequence with the length $L_2$ corresponds;

S3': traversing each integral value in the range of the integral value of the integer frequency offset to which the one sequence corresponds, so as to obtain an integral value of the integer frequency offset to which the one sequence corresponds, which minimizes the absolute value of the difference between the total frequency offsets to which all the sequences correspond; and S4': obtaining an integral value of the integer frequency offset to which the other sequence corresponds by using the integral value of the integer frequency offset to which the one sequence corresponds, and using the integral value of the integer frequency offset to which each of the sequences corresponds to estimate the integer frequency offset to which each of the sequences corresponds.

In another implementation of step 803, the number of the multiple sequences is two, and for each of the sequences, the integer frequency offset to which it corresponds may be estimated according to the method below, which including:

S1": calculating a coarse estimation value of the total frequency offset according to the formula below:

$$\delta f_c = \frac{\arg(c_1 c_2^*)}{2\pi} \frac{f_s}{L_1 - L_2};$$

where, $c_1$ and $c_2$ are the correlation values to which the two sequences correspond, respectively, $f_s$ is the sampling rate, and $L_1$ and $L_2$ are the lengths of the two sequences, respectively;

S2": calculating an integral value of the integer frequency offset to which each of the sequences corresponds according to the formula below:

$$n_1 = \text{round}\left(\frac{\delta f_c}{f_s / L_1}\right),$$

$$n_2 = \text{round}\left(\frac{\delta f_c}{f_s / L_2}\right);$$

where, $\Delta f_{max} \leq f_s / 2|L_1 - L_2|$, $\Delta f_{max}$ is the possible maximal value of the frequency offset between the emitting laser and the local oscillator laser; and S3": determining the integer frequency offset to which each of the sequences corresponds by using the integral value of the integer frequency offset to which each of the sequences corresponds.

A total frequency offset may be determined in step 804 by using the decimal frequency offset to which each of the sequences corresponds obtained through calculation in step 802 and the integer frequency offset to which each of the sequences corresponds determined in step 803.

In this embodiment, when the signal is applied at two polarization states, the correlation value to which each of the sequences corresponds is an average value or a summation of the correlation values at the two polarization states.

With the method of the embodiment of the present disclosure, the method provided by the embodiment of the present disclosure differs from existing methods applicable to an OFDM system in that it completely operates in a time domain, needs only to calculate correlation values of some sequences with different lengths without FFT operation, and is simple in implementation; and the method of the embodiment of the present disclosure differs from existing methods applicable to single-carrier systems in that it uses repeated sequences with different lengths provided in transmission data, needs not to perform equalization on the signals first, has no process of iterative convergence, is able to obtain a result of frequency offset estimation quickly, and is high in precision. It is shown by simulation that the method is well tolerable to various channel damages, and is able to give a reliable result of frequency offset estimation.

An embodiment of the present disclosure further provides a computer-readable program, wherein when the program is executed in a receiver, the program enables a computer to carry out the method for estimating frequency offset as described in Embodiment 6 in the receiver.

An embodiment of the present disclosure further provides a storage medium in which a computer-readable program is stored, wherein the computer-readable program enables a computer to carry out the method for estimating frequency offset as described in Embodiment 6 in a receiver.

The exemplary embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the exemplary embodiments of the present disclosure include other implementations, wherein the functions may be executed in manners different from those shown or discussed, including executing the functions according to the related functions in a substantially simultaneous manner or in a reverse order, which should be understood by those skilled in the art to which the present disclosure pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used with the instruction executing system, device or apparatus. A computer readable medium may be, for example, but not limited to, a magnetic, optical, electromagnetic, infrared or semiconductor system, device, apparatus, or a propagation medium. More particular examples (inexhaustive lists) of a computer readable medium may include the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present disclosure. It should be understood that a person of ordinary skill in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present disclosure by using the devices.

Particular embodiments of the present disclosure have been disclosed herein. Those skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular exemplary embodiment or embodiments have been shown and the present disclosure has been described, it is clear and understood that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the a particular feature of the present disclosure is described with respect to only one or more of the illustrated embodiments, such a feature may be combined with one or more other features of other embodiments as desired and in consideration of advantageous aspects of any given or particular application.

As for implementations including the above multiple embodiments, following supplements are further disclosed.

Supplement 1. A method for estimating frequency offset, including:

calculating a correlation value of each of multiple sequences with different lengths according to a received signal containing the multiple sequences with different lengths, wherein each of the sequences is repeatedly transmitted many times in the signal;

calculating a decimal frequency offset to which each of the sequences corresponds according to the correlation value of each of the sequences;

determining an integer frequency offset to which each of the sequences corresponds according to the decimal frequency offset to which each of the sequences corresponds; and determining a total frequency offset according to the decimal frequency offset to which each of the sequences corresponds and the integer frequency offset to which each of the sequences corresponds.

Supplement 2. The method according to supplement 1, wherein the correlation value to which each of the sequences corresponds is calculated by using the formula below:

$$c_{seq} = \Sigma_{i=0}^{L_{seq}-1} r(s_{seq}+i) r^*(s_{seq}+i+L_{seq});$$

where, $c_{seq}$ is the correlation value to which the sequence corresponds, $L_{seq}$ is the length of the sequence, $s_{seq}$ is the starting position of the sequence, and i is the serial number of sampling points;

Supplement 3. The method according to supplement 1, wherein the decimal frequency offset to which each of the sequences corresponds is calculated by using the formula below:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

Supplement 4. The method according to supplement 1, wherein for each of the sequences, the steps of determining the integer frequency offset to which it corresponds include:

S1: determining a range of an integral value of the integer frequency offset to which each of the sequences corresponds according to the formula below:

$$|n_{seq}| \le N_{seq};$$

where, $$N_{seq} = \text{ceil}\left(\frac{\Delta f_{max}}{f_s/L_{seq}}\right) + 1,$$

$\Delta f_{max}$ is a possible maximal value of a frequency offset between an emitting laser and a local oscillator laser;

S2: traversing each integral value in the range of the integral value of the integer frequency offset to which each of the sequences corresponds, so as to obtain an integral value of the integer frequency offset to which each of the sequences corresponds, which minimizes the absolute value of the difference between the total frequency offsets to which all the sequences correspond; and S3: determining the integer frequency offset to which each of the sequences corresponds by using the integral value of the integer frequency offset to which each of the sequences corresponds.

Supplement 5. The method according to supplement 1, wherein the number of the multiple sequences is two, and for each of the sequences, the steps of determining the integer frequency offset to which it corresponds include:

S1': determining a range of an integral value of the integer frequency offset to which one of the two sequences corresponds according to the formula below:

$$|n_1| \le N_1;$$

where, $$N_1 = \text{ceil}\left(\frac{\Delta f_{max}}{f_s/L_1}\right) + 1,$$

$\Delta f_{max}$ is the possible maximal value of the frequency offset between the emitting laser and the local oscillator laser, $L_1$ is the length of the one sequence, and $n_1$ is the integral value of the integer frequency offset to which the one sequence corresponds;

S2': determining an integral value of the integer frequency offset to which the other sequence corresponds according to the formula below:

$$n_2 = \text{round}\left(\frac{n_1 f_s/L_1 + \delta f_1 - \delta f_2}{f_s/L_2}\right);$$

where, $n_1$ is the integral value of the integer frequency offset to which the one sequence corresponds, $n_2$ is the integral value of the integer frequency offset to which the other sequence corresponds, $L_1$ is the length of the one sequence, $L_2$ is the length of the other sequence, $\delta f_1$ is the decimal frequency offset to which the sequence with the length $L_1$ corresponds, and $\delta f_2$ is the decimal frequency offset to which the sequence with the length $L_2$ corresponds;

S3': traversing each integral value in the range of the integral value of the integer frequency offset to which the one sequence corresponds, so as to obtain an integral value of the integer frequency offset to which the one sequence corresponds, which minimizes the absolute value of the difference between the total frequency offsets to which all the sequences correspond; and S4': obtaining an integral value of the integer frequency offset to which the other sequence corresponds by using the integral value of the integer frequency offset to which the one sequence corresponds, and using the integral value of the integer frequency offset to which each of the sequences corresponds to determine the integer frequency offset to which each of the sequences corresponds.

Supplement 6. The method according to supplement 1, wherein the number of the multiple sequences is two, and for each of the sequences, the steps of determining the integer frequency offset to which it corresponds include:

S1'': calculating a coarse estimation value of the total frequency offset according to the formula below:

$$\delta f_c = \frac{\arg(c_1 c_2^*)}{2\pi} \frac{f_s}{L_1 - L_2};$$

where, $c_1$ and $c_2$ are the correlation values to which the two sequences correspond, respectively, $f_s$ is the sampling rate, and $L_1$ and $L_2$ are the lengths of the two sequences, respectively;

S2'': calculating an integral value of the integer frequency offset to which each of the sequences corresponds according to the formula below:

$$n_1 = \text{round}\left(\frac{\delta f_c}{f_s/L_1}\right),$$

$$n_2 = \text{round}\left(\frac{\delta f_c}{f_s/L_2}\right);$$

where, $\Delta f_{max} \le f_s/2|L_1-L_2|$, $\Delta f_{max}$ is the possible maximal value of the frequency offset between the emitting laser and the local oscillator laser; and S3'': determining the integer frequency offset to which each of the sequences corresponds by using the integral value of the integer frequency offset to which each of the sequences corresponds.

Supplement 7. The method according to supplement 1, wherein when the signal is applied at two polarization states, the correlation value to which each of the sequences corresponds is an average value or a summation of the correlation values at the two polarization states.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus for estimating frequency offset, comprising:
    a memory that stores a plurality of instructions; and
    a processor coupled to the memory and configured to execute the instructions to:
    calculate a correlation value of each of multiple sequences with different lengths according to a received signal containing the sequences with different lengths, wherein each of the sequences is repeatedly present many times in the received signal;

calculate a decimal frequency offset to which each of the sequences corresponds according to the correlation value of each of the sequences;

determine an integer frequency offset to which each of the sequences corresponds according to the decimal frequency offset to which each of the sequences corresponds; and determine a total frequency offset according to the decimal frequency offset to which each of the sequences corresponds and the integer frequency offset to which each of the sequences corresponds, so as to obtain a result of frequency offset estimation, wherein, signal compensation is performed at a receiver end in accordance with the result of frequency offset estimation, wherein, the processor is configured to execute the instructions to:

calculate the correlation value to which each of the sequences corresponds by using:

$$c_{seq} = \Sigma_{i=0}^{L_{seq}-1} r(s_{seq}+i) r^*(s_{seq}+i+L_{seq});$$

where, $c_{seq}$ is the correlation value to which the sequence corresponds, $L_{seq}$ is a length of the sequence, $s_{seq}$ is a starting position of the sequence, and i is a serial number of sampling points;

and calculate the decimal frequency offset to which each of the sequences corresponds by using:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

2. The apparatus according to claim 1, wherein the processor is configured to execute the instructions to: determine a range of an integral value of the integer frequency offset to which each of the sequences corresponds according to:

$$|n_{seq}| \le N_{seq};$$

where, $$N_{seq} = \text{ceil}\left(\frac{\Delta f_{max}}{f_s/L_{seq}}\right) + 1,$$

$\Delta f_{max}$ is a maximal value of a frequency offset between an emitting laser and a local oscillator laser;

traverse each integral value in the range of the integral value of the integer frequency offset to which each of the sequences corresponds, to obtain the integral value of the integer frequency offset to which each of the sequences corresponds, which minimizes an absolute value of a difference between total frequency offsets to which all the sequences correspond; and determine the integer frequency offset to which each of the sequences corresponds by using the integral value of the integer frequency offset to which each of the sequences corresponds.

3. The apparatus according to claim 1, wherein a number of the multiple sequences is two, and the processor is configured to execute the instructions to: determine the range of the integral value of the integer frequency offset to which one of the two sequences corresponds according to:

$$|n_1| \le N_1;$$

where, $$N_1 = \text{ceil}\left(\frac{\Delta f_{max}}{f_s/L_1}\right) + 1,$$

$\Delta f_{max}$ is a maximal value of the frequency offset between an emitting laser and a local oscillator laser, $L_1$ is a length of the one sequence, and $n_1$ is the integral value of the integer frequency offset to which the one sequence corresponds;

determine the integral value of the integer frequency offset to which another sequence corresponds according to:

$$n_2 = \text{round}\left(\frac{n_1 f_s/L_1 + \delta f_1 - \delta f_2}{f_s/L_2}\right);$$

where, $n_1$ is the integral value of the integer frequency offset to which the one sequence corresponds, $n_2$ is the integral value of the integer frequency offset to which another sequence corresponds, $L_1$ is the length of the one sequence, $L_2$ is the length of the another sequence, $\delta f_1$ is the decimal frequency offset to which the sequence with length $L_1$ corresponds, and $\delta f_2$ is the decimal frequency offset to which the sequence with length $L_2$ corresponds;

traverse each integral value in a range of the integral value of the integer frequency offset to which the one sequence corresponds, to obtain an integral value of the integer frequency offset to which the one sequence corresponds, which minimizes an absolute value of a difference between total frequency offsets to which all the sequences correspond; and obtain an integral value of the integer frequency offset to which the another sequence corresponds by using the obtained integral value of the integer frequency offset to which the one sequence corresponds, which minimizes an absolute value of a difference between total frequency offsets to which all the sequences correspond, and use the integral value of the integer frequency offset to which each of the sequences corresponds to determine the integer frequency offset to which each of the sequences corresponds.

4. The apparatus according to claim 1, wherein a number of the multiple sequences is two, and the processor is configured to execute the instructions to:

calculate a coarse estimation value of the total frequency offset according to:

$$\delta f_c = \frac{\arg(c_1 c_2^*)}{2\pi} \frac{f_s}{L_1 - L_2};$$

where, $c_1$ and $c_2$ are the correlation values to which the two sequences correspond, respectively, $f_s$ is a sampling rate, and $L_1$ and $L_2$ are lengths of the two sequences, respectively;

calculate an integral value of the integer frequency offset to which each of the sequences corresponds according to:

$$n_1 = \text{round}\left(\frac{\delta f_c}{f_s/L_1}\right),$$

$$n_2 = \text{round}\left(\frac{\delta f_c}{f_s/L_2}\right);$$

where, $\Delta f_{max} \leq f_s/2|L_1 - L_2|$, $\Delta f_{max}$ is a maximal value of the frequency offset between an emitting laser and a local oscillator laser; and determine the integer frequency offset to which each of the sequences corresponds by using the integral value of the integer frequency offset to which each of the sequences corresponds.

5. The apparatus according to claim 1, wherein when the received signal is applied at two polarization states, the correlation value to which each of the sequences corresponds is one of an average value and a summation of the correlation values at the two polarization states.

6. A single-polarization receiver, comprising an apparatus for estimating frequency offset, the apparatus for estimating frequency offset comprising:
a memory that stores a plurality of instructions; and
a processor coupled to the memory and configured to execute the instructions to:
calculate a correlation value of each of multiple sequences with different lengths according to a received signal containing the multiple sequences with different lengths, wherein each of the sequences is repeatedly present many times in the received signal;
calculate a decimal frequency offset to which each of the sequences corresponds according to the correlation value of each of the sequences;
determine an integer frequency offset to which each of the sequences corresponds according to the decimal frequency offset to which each of the sequences corresponds; and
determine a total frequency offset according to the decimal frequency offset to which each of the sequences corresponds and the integer frequency offset to which each of the sequences corresponds, so as to obtain a result of frequency offset estimation,
wherein, signal compensation is performed by the single-polarization receiver in accordance with the result of frequency offset estimation,
wherein, the processor is configured to execute the instructions to:
calculate the correlation value to which each of the sequences corresponds by using:

$$c_{seq} = \sum_{i=0}^{L_{seq}-1} r(s_{seq}+i) r^*(s_{seq}+i+L_{seq});$$

where, $c_{seq}$ is a correlation value to which the sequence corresponds, $L_{seq}$ is a length of the sequence, $s_{seq}$ is a starting position of the sequence, and i is a serial number of a sampling point;
and calculate the decimal frequency offset to which each of the sequences corresponds by using:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

7. The single-polarization receiver according to claim 6, wherein the processor is configured to execute the instructions to: determine a range of an integral value of the integer frequency offset to which each of the sequences corresponds according to:

$$|n_{seq}| \leq N_{seq};$$

where, $$N_{seq} = \text{ceil}\left(\frac{\Delta f_{max}}{f_s/L_{seq}}\right) + 1,$$

$\Delta f_{max}$ is a maximal value of a frequency offset between an emitting laser and a local oscillator laser;
traverse each integral value in a range of the integral value of the integer frequency offset to which each of the sequences corresponds, to obtain the integral value of the integer frequency offset to which each of the sequences corresponds, which minimizes an absolute value of a difference between total frequency offsets to which all the sequences correspond; and
determine the integer frequency offset to which each of the sequences corresponds by using the integral value of the integer frequency offset to which each of the sequences corresponds.

8. The single-polarization receiver according to claim 6, wherein a number of the multiple sequences is two, and the processor is configured to execute the instructions to: determine a range of an integral value of the integer frequency offset to which one of the two sequences corresponds according to:

$$|n_1| \leq N_1;$$

where, $$N_1 = \text{ceil}\left(\frac{\Delta f_{max}}{f_s/L_1}\right) + 1,$$

$\Delta f_{max}$ is a maximal value of the frequency offset between an emitting laser and a local oscillator laser, $L_1$ is a length of the one sequence, and $n_1$ is the integral value of the integer frequency offset to which one sequence corresponds;
determine an integral value of the integer frequency offset to which another sequence corresponds according to:

$$n_2 = \text{round}\left(\frac{n_1 f_s/L_1 + \delta f_1 - \delta f_2}{f_s/L_2}\right);$$

where, $n_1$ is the integral value of the integer frequency offset to which the one sequence corresponds, $n_2$ is the integral value of the integer frequency offset to which the another sequence corresponds, $L_1$ is the length of the one sequence, $L_2$ is the length of the other sequence, $\delta f_1$ is the decimal frequency offset to which the sequence with the length $L_1$ corresponds, and $\delta f_2$ is the decimal frequency offset to which the sequence with the length $L_2$ corresponds;
traverse each integral value in a range of the integral value of the integer frequency offset to which the one sequence corresponds, to obtain an integral value of the integer frequency offset to which the one sequence corresponds, which minimizes an absolute value of a difference between total frequency offsets to which all the sequences correspond; and obtain the integral value of the integer frequency offset to which the another sequence corresponds by using the obtained integral value of the integer frequency offset to which the one sequence corresponds, which minimizes an absolute value of a difference between total frequency offsets to which all the sequences correspond, and use the integral value of the integer frequency offset to which each of the sequences corresponds to determine the integer frequency offset to which each of the sequences corresponds.

9. The single-polarization receiver according to claim 6, wherein a number of the multiple sequences is two, and the processor is configured to execute the instructions to:

calculate a coarse estimation value of the total frequency offset:

$$\delta f_c = \frac{\arg(c_1 c_2^*)}{2\pi} \frac{f_s}{L_1 - L_2};$$

where, $c_1$ and $c_2$ are correlation values to which the two sequences correspond, respectively, $f_s$ is a sampling rate, and $L_1$ and $L_2$ are lengths of the two sequences, respectively;

calculate an integral value of the integer frequency offset to which each of the sequences corresponds:

$$n_1 = \mathrm{round}\left(\frac{\delta f_c}{f_s/L_1}\right),$$

$$n_2 = \mathrm{round}\left(\frac{\delta f_c}{f_s/L_2}\right);$$

where, $\Delta f_{max} \leq f_s/2|L_1-L_2|$, $\Delta f_{max}$ is a maximal value of the frequency offset between an emitting laser and a local oscillator laser; and determine the integer frequency offset to which each of the sequences corresponds by using the integral value of the integer frequency offset to which each of the sequences corresponds.

10. A dual-polarization receiver, comprising an apparatus for estimating frequency offset, the apparatus for estimating frequency offset comprising:

a memory that stores a plurality of instructions; and
a processor coupled to the memory and configured to execute the instructions to:

calculate a correlation value of each of multiple sequences with different lengths according to a received signal containing the multiple sequences with different lengths, wherein each of the sequences is repeatedly present many times in the received signal;

calculate a decimal frequency offset to which each of the sequences corresponds according to the correlation value of each of the sequences;

determine an integer frequency offset to which each of the sequences corresponds according to the decimal frequency offset to which each of the sequences corresponds; and determine a total frequency offset according to the decimal frequency offset to which each of the sequences corresponds and the integer frequency offset to which each of the sequences corresponds, so as to obtain a result of frequency offset estimation, wherein, signal compensation is performed by the dual-polarization receiver in accordance with the result of frequency offset estimation, wherein, the processor is configured to execute the instructions to:

calculate the correlation value to which each of the sequences corresponds by using:

$$c_{seq} = \Sigma_{i=0}^{L_{seq}-1} r(s_{seq}+i) r^*(s_{seq}+i+L_{seq});$$

where, $c_{seq}$ is the correlation value to which the sequence corresponds, $L_{seq}$ is a length of the sequence, $s_{seq}$ is a starting position of the sequence, and i is a serial number of a sampling point;

and calculate the decimal frequency offset to which each of the sequences corresponds by using:

$$\delta f_{seq} = \frac{f_s}{L_{seq}} \frac{\arg(c_{seq})}{2\pi};$$

where, $\delta f_{seq}$ is the decimal frequency offset to which the sequence corresponds, $f_s$ is a sampling rate, $c_{seq}$ is the correlation value to which the sequence corresponds, and $L_{seq}$ is the length of the sequence.

11. The dual-polarization receiver according to claim 10, wherein the processor is configured to execute the instructions to: determine a range of an integral value of the integer frequency offset to which each of the sequences corresponds according to:

$$|n_{seq}| \leq N_{seq};$$

where, $$N_{seq} = \mathrm{ceil}\left(\frac{\Delta f_{max}}{f_s/L_{seq}}\right) + 1,$$

$\Delta f_{max}$ is a maximal value of a frequency offset between an emitting laser and a local oscillator laser;

traverse each integral value in a range of the integral value of the integer frequency offset to which each of the sequences corresponds, to obtain an integral value of the integer frequency offset to which each of the sequences corresponds, which minimizes an absolute value of a difference between total frequency offsets to which all the sequences correspond; and determine the integer frequency offset to which each of the sequences corresponds by using the integral value of the integer frequency offset to which each of the sequences corresponds.

12. The dual-polarization receiver according to claim 10, wherein a number of the multiple sequences is two, and the processor is configured to execute the instructions to: determine a range of an integral value of the integer frequency offset to which one of the two sequences corresponds according to:

$$|n_1| \leq N_1;$$

where, $$N_1 = \mathrm{ceil}\left(\frac{\Delta f_{max}}{f_s/L_1}\right) + 1,$$

$\Delta f_{max}$ is a maximal value of the frequency offset between an emitting laser and a local oscillator laser, $L_1$ is a length of one sequence, and $n_1$ is the integral value of the integer frequency offset to which the one sequence corresponds;
determine an integral value of the integer frequency offset to which another sequence corresponds according to:

$$n_2 = \text{round}\left(\frac{n_1 f_s/L_1 + \delta f_1 - \delta f_2}{f_s/L_2}\right);$$

where, $n_1$ is the integral value of the integer frequency offset to which the one sequence corresponds, $n_2$ is the integral value of the integer frequency offset to which the another sequence corresponds, $L_1$ is length of the one sequence, $L_2$ is length of the another sequence, $\delta f_1$ is the decimal frequency offset to which the sequence with length $L_1$ corresponds, and $\delta f_2$ is the decimal frequency offset to which the sequence with length $L_2$ corresponds;

traverse each integral value in the range of the integral value of the integer frequency offset to which the one sequence corresponds, to obtain an integral value of the integer frequency offset to which the one sequence corresponds, which minimizes the absolute value of the difference between total frequency offsets to which all the sequences correspond; and obtain an integral value of the integer frequency offset to which the another sequence corresponds by using the obtained integral value of the integer frequency offset to which the one sequence corresponds, which minimizes the absolute value of the difference between total frequency offsets to which all the sequences correspond, and use the integral value of the integer frequency offset to which each of the sequences corresponds to determine the integer frequency offset to which each of the sequences corresponds.

13. The dual-polarization receiver according to claim 10, wherein a number of the multiple sequences is two, and the processor is configured to execute the instructions to: calculate a coarse estimation value of the total frequency offset:

$$\delta f_c = \frac{\arg(c_1 c_2^*)}{2\pi} \frac{f_s}{L_1 - L_2};$$

where, $c_1$ and $c_2$ are correlation values to which the two sequences correspond, respectively, $f_s$ is a sampling rate, and $L_1$ and $L_2$ are lengths of the two sequences, respectively;

calculate an integral value of the integer frequency offset to which each of the sequences corresponds:

$$n_1 = \text{round}\left(\frac{\delta f_c}{f_s/L_1}\right),$$

$$n_2 = \text{round}\left(\frac{\delta f_c}{f_s/L_2}\right);$$

where, $\Delta f_{max} \leq f_s/2|L_1-L_2|$, $\Delta f_{max}$ is a maximal value of the frequency offset between an emitting laser and a local oscillator laser; and determine the integer frequency offset to which each of the sequences corresponds by using the integral value of the integer frequency offset to which each of the sequences corresponds.

14. The dual-polarization receiver according to claim 10, wherein the correlation value to which each of the sequences corresponds is one of an average value and a summation of the correlation values at the two polarization states.

* * * * *